March 22, 1966  L. W. RICKETTS ET AL  3,241,373
STATIC SAFETY AND ARMING DEVICE
Filed April 17, 1961  2 Sheets-Sheet 1

INVENTOR.
LUTHER W. RICKETTS,
BY LEONARD F. GLAESER, JR.
and KENNETH L. SEIB

Lockwood, Woodard, Smith & Weikart
Attorneys

March 22, 1966  L. W. RICKETTS ET AL  3,241,373
STATIC SAFETY AND ARMING DEVICE
Filed April 17, 1961  2 Sheets-Sheet 2

INVENTOR.
LUTHER W. RICKETTS
LEONARD F. GLAESER, JR.
BY  and KENNETH L. SEIB

Lockwood, Woodard, Smith & Weikart
Attorneys

United States Patent Office 3,241,373
Patented Mar. 22, 1966

3,241,373
STATIC SAFETY AND ARMING DEVICE
Luther W. Ricketts, Urbana, Leonard F. Glaeser, Jr., Champaign, and Kenneth L. Seib, Urbana, Ill., assignors to The Magnavox Company, Fort Wayne, Ind., a corporation of Delaware
Filed Apr. 17, 1961, Ser. No. 103,516
2 Claims. (Cl. 73—503)

This invention relates generally to devices performing integrating and switching functions in response to acceleration forces of predetermined magnitude. More particularly, the invention relates to devices to perform certain switching operations during the course of travel of a missile, such operations being, for example, the arming of the missile or the initiation of operation of various propulsion stages. The structure of the present invention fulfills its purposes by sensing acceleration or G-force and providing output voltages which are proportional to velocity and/or the distance traveled by the missile.

Safety and arming devices of several types are currently in use. Most of these are mechanical in nature leading to a switch closure when a predetermined event occurs. Spring or magnetically held masses are used to close switches at predetermined acceleration levels. The principle of metering solids through an orifice or of a mass suspended in a viscous fluid is used to close switches at predetermined distances. Spring timers are used to close switches after a predetermined delay. Due to mechanical complexity and to the fact that appreciable movement is involved, the ruggedness of these devices is inherently sacrificed. Versatility is also lacking since a complete mechanical redesign is required every time triggering levels are altered.

The structure of the present invention includes a transducer or sensing device which provides an output responsive to the occurrence of an accelerational force applied in the desired direction and is unresponsive to forces applied in directions other than the desired direction. The transducer referred to above provides an input for an amplifying and integrating circuit. The integrating portion of the circuit provides the required integration with respect to time of the acceleration signal so as to produce outputs which are proportional to velocity and distance traveled.

The primary object of the present invention is to provide an acceleration integrating device, usable primarily as a safety and arming device for missiles, which will operate properly over a wide range of accelerational force magnitudes.

A further object of the present invention is to provide a temperature stabilized transistor circuit for amplifying an input signal proportional to acceleration and also integrating the signal with respect to time so as to produce outputs proportional to velocity and/or distance traveled.

A further object of the present invention is to provide a transducer or sensing element of simplified construction and responsive only to forces applied in a desired direction.

A further object of the present invention is to provide a small, accurate, rugged static unit for a safety and arming device to replace existing mechanical escapements currently in use in various missiles and the like.

The full nature of the invention will be understood from the accompanying drawings and the following description and the claims.

FIG. 1 presents a set of curves representing the acceleration, velocity and distance traveled of a vehicle, such as a missile, as a function of time.

Figure 1:
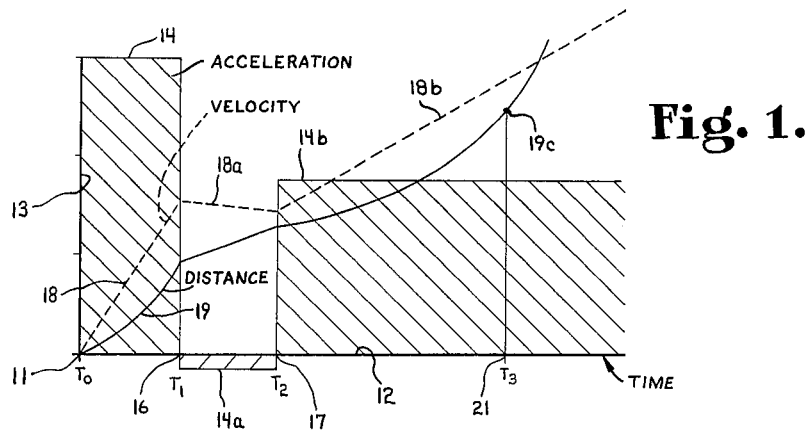

Referring to FIG. 1, the curves may be considered illustrative of the acceleration, velocity, and distance traveled of a two-stage rocket moving in a generally upward direction. Beginning with the point 11, increasing values of time, T, are represented along the abscissa 12. Acceleration, velocity and distance traveled may all be represented by distances along the ordinate 13. It should be understood that these values may also be represented by voltages.

Assume that the time of firing of the first stage of the rocket is at time $T_0$ at point 11 and that the acceleration is constant as indicated by the curve 14 from the time $T_0$ to time $T_1$ at point 16. Beginning at time $T_1$ and point 16 the first stage has ceased to fire and there is a pause between time $T_1$ and time $T_2$ until the second stage fires. During this time between points 16 and 17, the force of gravity is acting on the rocket to decelerate it or give it a negative acceleration in the upward direction as indicated by the portion 14a of the curve 14. During the firing of the first stage, the velocity indicated by the curve 18 increased steadily, and during the time between firing of the first stage at $T_1$, and firing of the second stage at $T_2$ the velocity decreases slightly due to the negative acceleration. This is indicated by the slightly falling portion 18a of curve 18.

At time $T_2$ the second stage of the rocket fires and the acceleration during that stage may be considered constant as represented by the line 14b and is somewhat less than that provided by the first stage. During the second stage firing, beginning at time $T_2$, point 17, the velocity increases as indicated by portion 18b of curve 18. During the firing of the two stages and the pause between firings, the distance traveled by the rocket is continuously increasing as indicated by the curve 19. At time $T_3$ at point 21 on abscissa 12 the distance traveled by the rocket is great enough that it is safe to arm the rocket. Accordingly, it is a purpose of this invention to provide an output signal at time $T_3$ in response to a voltage indicating that a safe distance has been traveled by the rocket as indicated by point 19c on curve 19.

The present invention converts an acceleration or G-force into usable D.C. output voltages proportional to velocity and/or distance traveled. Since distance is found by the formula $$S = \iint a\, dt^2 \qquad (1)$$

where:

S = distance traveled
a = acceleration of rocket
t = elapsed time it is necessary to perform this double integration to obtain the correct output proportional to distance. Only one integration is needed to have an output proportional to velocity v.

Probably the simplest physical model of the integration here involved is the summation of an area. Considering a zero reference or starting position, at point 11 in FIG. 1, all the area above and to the right of the reference lines 12 and 13 are added, and all the area to the right and below the reference lines are subtracted (negative areas).

Curve 14 may be the relative output voltage given by a transducer which is directly proportional to the G-force of acceleration encountered by the missile or rocket. The velocity curve 18 demonstrates this summing of the area beneath the acceleration curve. Likewise, the distance curve 19 demonstrates the summing of the area beneath the velocity curve. Electronic circuits of this invention perform these mathematical operations, and when incorporated with a transducer or acceleration sensor and a suitable output switch the total unit is complete.

Figure 2:
FIG. 2 is a block diagram of the present invention.

FIG. 2 shows a block diagram of the invention. In FIG. 2, transducer 22, which is responsive to positive and negative accelerations of the missile or rocket, hereinafter called vehicle, in a certain direction, has an output coupled to the buffer and amplifier 23. A first operational integrator 24 is coupled to the buffer and amplifier 23 and produces an output representing velocity of the vehicle in the direction of interest. A second operational integrator 26 is coupled to the first integrator and produces an output representing distance traveled by the vehicle. A switch circuit 27 is coupled to the output of the second integrator to produce an output when the level of output from the second integrator reaches a certain desired level.

Figure 3:
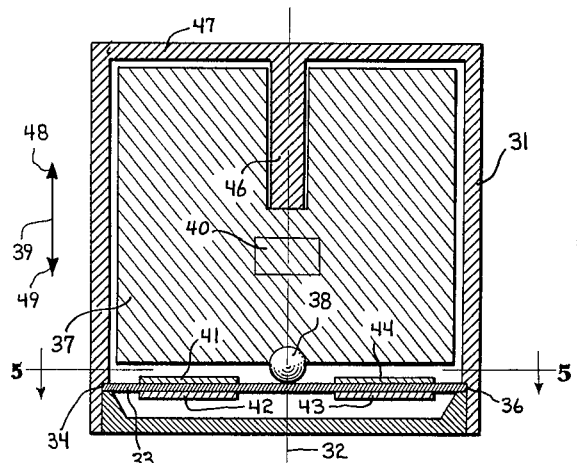
FIG. 3 is a cross-section of a cylindrical module illustrating certain of the important features of this invention.

FIG. 3 is a cross-section of a cylindrical module of this invention wherein a cylindrical housing is provided by the container 31 which is cylindrical with respect to the axis 32. A beam 33 is mounted with its ends fixed at 34 and 36 to the container 31. An inertia mass 37 which may if desired include the encapsulated transistor circuitry of this invention as designated by block 40 in FIG. 3, is mounted to the beam at the pivot 38 which could be a knife edge or a ball or the like. Arrow 39 indicates the direction of the motion to be sensed by this invention.

A plurality of strain gages 41, 42 43 and 44 is mounted to the beam in the manner shown schematically in FIG. 3. The axis of the container 31 is aligned in the direction of the motion to be sensed. Gages 41 and 42 are aligned in a projection transverse to the beam. Gages 43 and 44 are likewise aligned. A guide member 46 is mounted to the top 47 of the container and may be in the nature of a cylindrical pin to provide alignment of the inertia mass 37 in the container even though the container should be subjected to forces and motions transverse to the direction of arrow 39. For descriptive purposes, arrowhead 48 represents positive or upward motion in the direction of arrow 39 and negative or downward motion in the direction of arrow 39 is indicated by the arrowhead 49.

Figure 4:
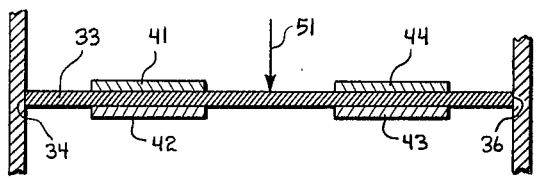
FIG. 4 is an enlarged schematic illustration of a portion of the invention shown in FIG. 3.

FIG. 4 is a partial section of the embodiment of FIG. 3 and illustrates schematically the relative positions of the strain gages 41, 42, 43 and 44. Arrow 51 indicates the direction of the force applied to the beam 33 when the vehicle is accelerated upwardly.

Figure 5:
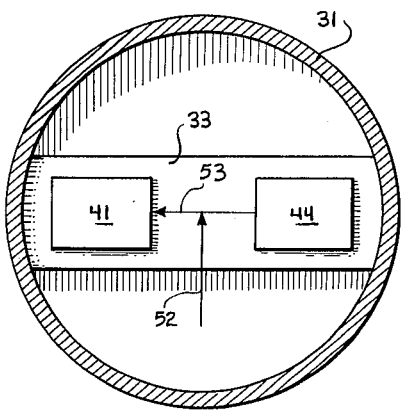
FIG. 5 is a section transverse to the axis of the container of FIG. 3 illustrating a typical configuration of the beam shown therein.

FIG. 5 is a partial section through the container of FIG. 3 taken along the lines 5—5 in FIG. 3 illustrating the position of the strain gages on the beam 33. Arrows 52 and 53 indicate directions of possible lateral strains on the beam induced by motions of the vehicle, which do not affect the proper operation or the accomplishment of the purpose of this invention, because of the novel structure employed.

Figure 6:
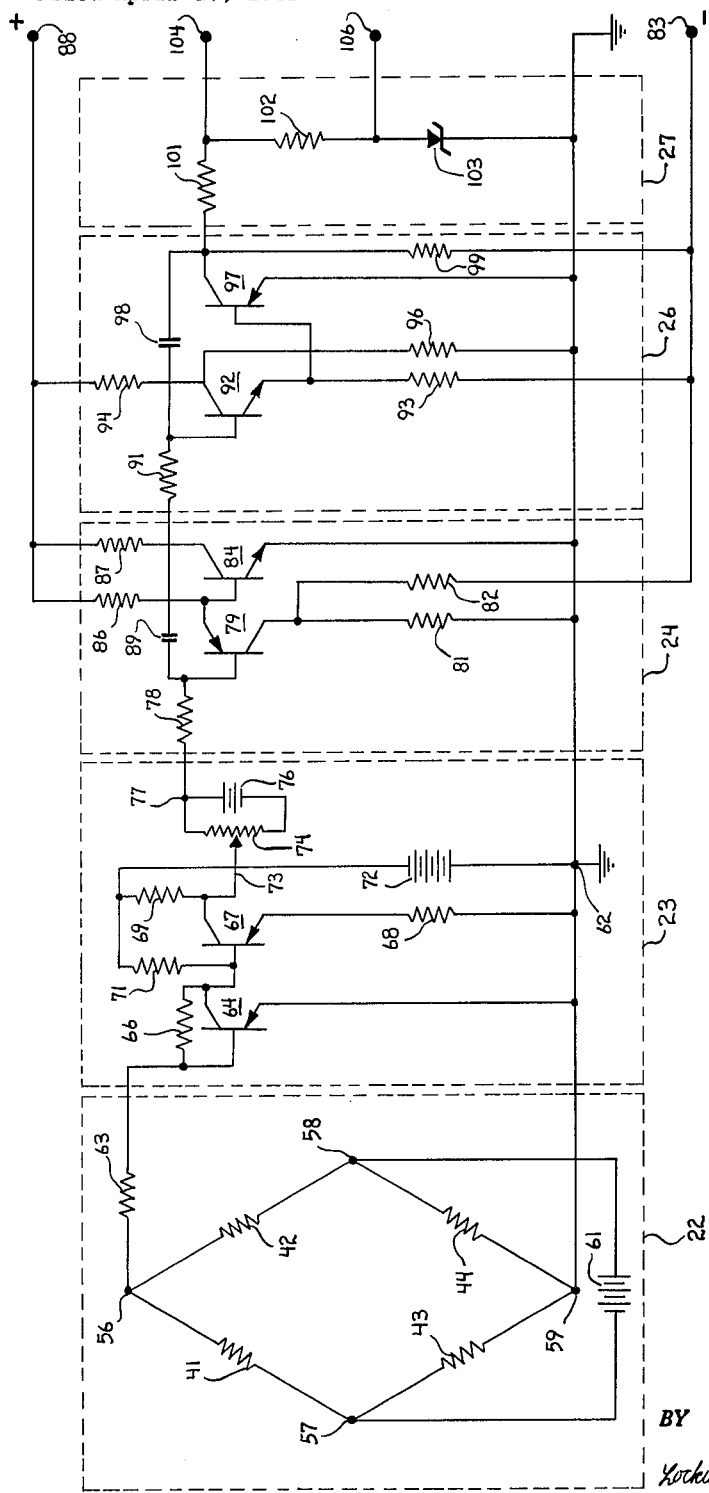
FIG. 6 is a schematic diagram of the electrical circuitry employed in a typical embodiment of this invention.

FIG. 6 is the electrical schematic diagram of a typical circuit employed according to this invention. In FIG. 6 the dotted outlines represent the blocks shown in FIG. 2. In FIG. 6, strain gages 41, 42, 43 and 44 are shown in a Wheatstone bridge connection. Gages 41 and 43 are coupled in common at 57, gages 42 and 44 are coupled in common at 58, and gages 43 and 44 are coupled in common at 59. A source of direct current potential is applied across the junctions 57 and 58 by the battery 61, but it should of course be understood that this supply could be provided by a voltage divider or the like coupled to a single source of D.C. potential.

Junction 59 is connected to ground 62. Junction 56 is connected through resistance 63 to the base of transistor 64 of the grounded emitter configuration amplifier 23. The collector of transistor 64 is connected through resistance 66 to its base. The collector of transistor 64 is also coupled to the base of transistor 67 having an emitter coupled through a swamping resistor 68 to ground. The collector of transistor 67 is coupled through the resistor 69 and resistor 71 to its base. The junction between resistor 69 and 71 is coupled to one side of a source of D.C. potential as indicated by battery 72 having its other side grounded. It should be understood of course that the source of direct current applied to the junction between resistors 69 and 71 could be provided by way of a voltage divider coupled to a source of direct current potential.

The output from the collector of transistor 67 appears on the wiper 73 of the potentiometer 74. A source of direct current potential such as the battery 76 is connected across the potentiometer 74.

The amplifier 23 converts the small millivolt output of the strain gage bridge to a usable magnitude of voltage for the first integrator. It acts as a buffer, supplying isolation, and is temperature adjustable to compensate for long term changes in ambient temperature or component characteristics by means of adjusting the wiper 73 of the potentiometer 74. The combination, therefore, of the battery 76 and the potentiometer 74 provides a drift setting means for the amplifier. Complementary symmetry transistors, thermistors, or transistor feedback compensation may be used to stabilize drift and thus eliminate the battery-potentiometer requirement.

The output of the buffer-amplifier 23 is available on conductor 77 which is fed through the resistance 78 to the base of the emitter follower transistor 79 of the first operational integrator 24. The collector of transistor 79 is connected through resistance 81 to ground and through resistance 82 to a source 83 of negative potential. The emitter of transistor 79 is connected to the base of transistor 84 the latter being in grounded emitter configuration. The emitter of transistor 79 and the collector of transistor 84 are connected through resistors 86 and 87 respectively to a source 88 of positive potential. The capacitive feedback for integration is obtained by way of capacitance 89 connected between the collector of transistor 84 and the base of emitter follower 79.

The output of the first operational integrator, which is available at the collector of transistor 84 is connected through the resistance 91 to the base of transistor 92, connected in emitter follower configuration, of the second operational integrator 26. The emitter of transistor 92 is connected through resistance 93 to source 83 of negative potential, and the collector of transistor 92 is connected through resistance 94 to the source 88 of positive potential. The collector of transistor 92 is also connected through the resistance 96 to ground.

The emitter of transistor 92 is connected to the base of transistor 93 having its emitter connected to ground. The collector of transistor 97 is connected through the capacitance 98 to the base of the emitter follower transistor 92 to provide the storage means for integration in the second operational integrator. The collector of transistor 97 is also connected through the resistance 99 to the negative side input terminal 83.

The output of the second integrator, available at the collector of transistor 97 is coupled to the switching stage 27 which, for purposes of illustration and as shown in the drawing, includes a resistance 101 connected to the collector of transistor 97. The other end of resistance 101 is connected through a resistance 102 and a zener diode 103 to ground. Output terminals 104 and 106 are connected to each end of the resistance 102. The zener diode is oriented for low resistance to the flow of positive current in the direction from resistance 102 toward ground after the zener voltage, 15 volts for example, has been exceeded.

Values and identities of typical resistances, capacitors and transistors used in the circuit of FIG. 6 are set out below:

| | |
|---|---|
| Resistance 41 | 120 ohms. |
| Resistance 42 | 120 ohms. |
| Resistance 43 | 120 ohms. |
| Resistance 44 | 120 ohms. |
| Resistance 63 | 10 kilohms. |
| Resistance 66 | 50 kilohms. |
| Resistance 68 | 560 ohms. |
| Resistance 69 | 7.5 kilohms. |
| Resistance 71 | 33 kilohms. |
| Resistance 78 | 30 kilohms. |
| Capacitor 89 | 10 microfarads. |
| Resistance 86 | 200 kilohms. |
| Resistance 87 | 33 kilohms. |
| Resistance 81 | 68 kilohms. |
| Resistance 82 | 240 kilohms. |
| Resistance 91 | 30 kilohms. |
| Resistance 94 | 220 kilohms. |
| Capacitor 98 | 10 microfarads. |
| Resistance 93 | 200 kilohms. |
| Resistance 96 | 68 kilohms. |
| Resistance 99 | 33 kilohms. |
| Transistor 64 | 2N404 (PNP). |
| Transistor 67 | 2N404 (PNP). |
| Transistor 79 | 2N404 (PNP). |
| Transistor 84 | 2N585 (NPN) |
| Transistor 92 | 2N585 (NPN). |
| Transistor 97 | 2N404 (PNP). |

OPERATION

The operation of the invention will be most readily understood if one first considers the operation of the strain gage bridge. The four gages 41, 42, 43 and 44 form the four arms of a Wheatstone bridge. The force which a known mass exerts upon this beam support is directly proportional to the acceleration of the transducer. As the beam support yields under stress, one side of the beam will be in tension while the opposite side is in compression. These changes are recorded by the strain gages in the form of a change in resistance of the strain gage. If two opposite arms of the Wheatstone bridge change in the same direction, i.e., $\Delta R$ is positive, while the remaining two opposite arms have a negative $\Delta R$ in the same proportion, the output of the Wheatstone bridge will be given by the formula $$E_0 = E_1 \Delta R / R \quad (2)$$

where:
$E_0$=voltage across junctions 56–59 in FIG. 6
$E_1$=voltage across junctions 57, 58
R=the steady state resistance of the strain gage
$\Delta R$=the gage factor times $\Delta L/L$
L=the length of the gage, and
$\Delta L$=the elongation produced by a given stress FIGS. 4 and 5 show the placement of the strain gages on the beam support and FIG. 6 shows their electrical connection in the Wheatstone bridge. A vertical force such as 51 in FIG. 4 will place the upper surface of the beam in compression causing the length of 41 and 44 to decrease, thereby decreasing their resistance. Likewise 42 and 43 will be on the oppositely facing tension side of the beam resulting in an increase in strain gage resistance. The strain gages are placed on the beam support so that the magnitude of the change in length is the same for each gage which results in an output voltage of magnitude given by Formula 2. Note that FIGS. 4 and 5 represent mechanical principle rather than construction detail.

Considering a force in the direction of 52 in FIG. 5, it can be seen that one-half of each strain gage will be in tension while the other half is in compression, giving a zero overall change of each gage. These changes do not alter the output voltage since the balance of the bridge is not affected. Likewise, a force in the direction of 53 in FIG. 5 changes the resistance of all the strain gages; but with no alteration in bridge balance.

The buffer-amplifier 23 converts the small millivolt output of the strain gage bridge to a usable magnitude of voltage for the first integrator. This amplifier stage supplies isolation and is temperature adjustable by the drift setting means to compensate for long term changes in ambient temperature.

The first and second operational integrators convert the incoming voltage proprotional to the acceleration to output voltages proportional to the velocity and distance, respectively. The purpose of using an operational integrator is to provide output voltages greater in magnitude than the initial input voltage so it can be directly fed into another stage without further amplification.

The output switching circuit 27 consisting of a zener diode and the resistor 102 connected in series directly across the output of the second integrator, produces a voltage drop across the output terminals 104 and 106 when the output voltage level from the second integrator reaches the zener breakdown voltage. This output voltage across the output terminal can then be used to "trigger" whatever following circuitry is employed such as a bellows motor for arming a missile or a motor for jettisoning a rocket stage or some other means external to the device. Other output buffers and switches may be used with this device. For example, a Schmitt trigger circuit may be used as the switch. When a predetermined voltage from the second operational integrator is reached, representing a certain distance traveled, the circuit is triggered. A power transistor on a succeeding stage could then switch sufficient power to excite an arming device or actuate some other device external to the invention herein.

By the use of alternate NPN and PNP transistors within each integrator of this invention, cancellation of base to emitter voltages which are functions of ambient temperature, can be provided for. Silicon transistors may be used in extremely high temperature environments. Active components are chosen in such manner that the final output of the second integrator is very near a zero reference and remains at this level until an acceleration is sensed by the strain gage transducer.

The device of this invention can be designed to be operational over a force range which varies from one G to several hundred times the value of G. A redesign of the strain gage bar (material and dimensions), an entirely different choice of strain gage bridges, or a redesign of the gain of the existing D.C. amplifier could each independently be used to establish the operational range. A wide range of acceleration-time products can also be achieved.

The time of arming can be set to practically any value desired. Wide ranges can be achieved by varying the resistance and/or the capacitance of the operational integrator circuit. The invention is also applicable to missiles fired other than upwardly.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A motion transducer for an accelerable vehicle to produce outputs sensibly responsive to unidirectional motions of the vehicle and comprising: a frame for mounting to the vehicle; a beam mounted to said frame at spaced points, a line connecting said points being transverse to the direction of vehicle motion to be sensed; an inertia mass; means coupling said mass to said beam between said points for deflecting said beam upon change of speed thereof caused by the vehicle; a guide member secured to said frame and having means thereon abuttingly engageable with said inertia mass in directions normal to the said direction of the vehicle motion to be sensed, the means coupling said inertia mass to said beam being capable of transmitting forces to said beam only in the direction of vehicle motion to be sensed; a plurality of strain gages on said beam and electrically coupled in bridge arrangement to produce electrical outputs in response to change of speed of the vehicle in the said direction of motion to be sensed, said inertia mass comprising encapsulated electronic circuitry coupled to the bridge outputs for processing.

2. A motion transducer for an accelerable vehicle to produce outputs sensibly responsive to unidirectional motions of the vehicle and comprising: a frame for mounting to the vehicle; a beam mounted to said frame at spaced points, a line connecting said points being transverse to the direction of vehicle motion to be sensed; an inertia mass; means coupling said mass to said beam between said points for deflecting said beam upon change of speed thereof caused by the vehicle; a guide member secured to said frame and having means thereon abuttingly engageable with said inertia mass in directions normal to the said direction of the vehicle motion to be sensed, the means coupling said inertia mass to said beam being capable of transmitting forces to said beam only in the direction of vehicle motion to be sensed; a plurality of strain gages on said beam and electrically coupled in bridge arrangement to produce electrical outputs in response to change of speed of the vehicle in the said direction of motion to be sensed, said inertia mass comprising electronic circuitry connected to the outputs of the bridge for producing an output representative of speed of the vehicle in said direction of motion to be sensed.

References Cited by the Examiner

UNITED STATES PATENTS

| 1,155,471 | 10/1915 | Davis | 73—514 |
|---|---|---|---|
| 1,972,578 | 9/1934 | Wallichs et al. | 73—141 |
| 2,062,784 | 12/1936 | Green | 73—71.2 |
| 2,377,212 | 5/1945 | Cottrell | 73—517 |
| 2,435,231 | 2/1948 | McPherson | 73—517 |
| 2,487,793 | 11/1949 | Esval | 73—517 |
| 2,613,071 | 10/1952 | Hansel | 73—490 |
| 2,638,335 | 5/1953 | Kammer et al. | 73—517 |
| 2,659,589 | 11/1953 | Hickman | 73—490 |
| 2,761,216 | 9/1956 | Gollub | 73—141 |
| 2,839,919 | 6/1958 | Lathrop | 73—141 |
| 2,861,789 | 11/1958 | Pope | 73—503 |
| 2,891,174 | 6/1959 | Hawkins | 307—88.5 |
| 2,904,681 | 9/1959 | Jones et al. | 250—27 |

FOREIGN PATENTS

| 837,321 | 4/1952 | Germany. |
|---|---|---|
| 763,225 | 12/1956 | Great Britain. |

OTHER REFERENCES

An article entitled: "Strain Gage Dynamometers and Indicators" from "Instruments," May 1950, pages 445–8 by R. E. Conover.

An article entitled: "New Method of Measuring Mechanical Vibrations" from "Instruments," March 1942, pages 83–87 and 94, page 85, by H. C. Werner.

RICHARD C. QUEISSER, *Primary Examiner.*

S. LEVINE, JAMES J. GILL, *Examiners.*